United States Patent

[11] 3,544,001

[72] Inventor Clayton W. Hahn,
1516 Sunrise Rim Road, Boise, Idaho 83705
[21] Appl. No. 811,374
[22] Filed March 28, 1969
[45] Patented Dec. 1, 1970

[54] LINEAR INTERPOLATING DEVICE
10 Claims, 2 Drawing Figs.
[52] U.S. Cl. .................................................. 235/61, 33/1
[51] Int. Cl. ................................................... G06g 1/00
[50] Field of Search............................................
235/61(Geom), 61(Poly), 61(Nav), 61(D), 61(E); 33/(IC)

[56] References Cited
UNITED STATES PATENTS
Re.10,511 8/1884 Tucker ......................... 235/61
2,843,935 7/1958 Gerber ......................... 33/1

Primary Examiner—Stephen J. Tomsky
Attorney—Berman, Davidson and Berman

ABSTRACT: A device to be employed for interpolation in finding the values of mathematical functions. The device consists of a rectangular frame calibrated along its transverse sides in digital values and along its longitudinal sides in subdivisions of the values to be found by interpolation, which are related to said digital values. For example, the digital values may represent the numerical values of trigonometric functions and the longitudinal sides may be calibrated in seconds or in fractions of an angle. A longitudinal bar is mounted on respective sliders on the transverse sides, and an additional slider is provided on one transverse side. The sliders on said one transverse side can be set respectively to upper and lower function limit values between which an interpolated angle value is to be found. A spring-biased cable connects said additional slider to the opposite end of the longitudinal bar. A further slider is mounted on the longitudinal bar and slidably carries a further bar extending perpendicular to the longitudinal bar. Said further bar has a transparent end plate provided with crosshairs. The further bar can be adjusted so that the intersection of the crosshairs registers with the cable. The position of said further bar then corresponds to the required angle interpolation value, read off from a scale on one of the longitudinal sides.

Patented Dec. 1, 1970
3,544,001
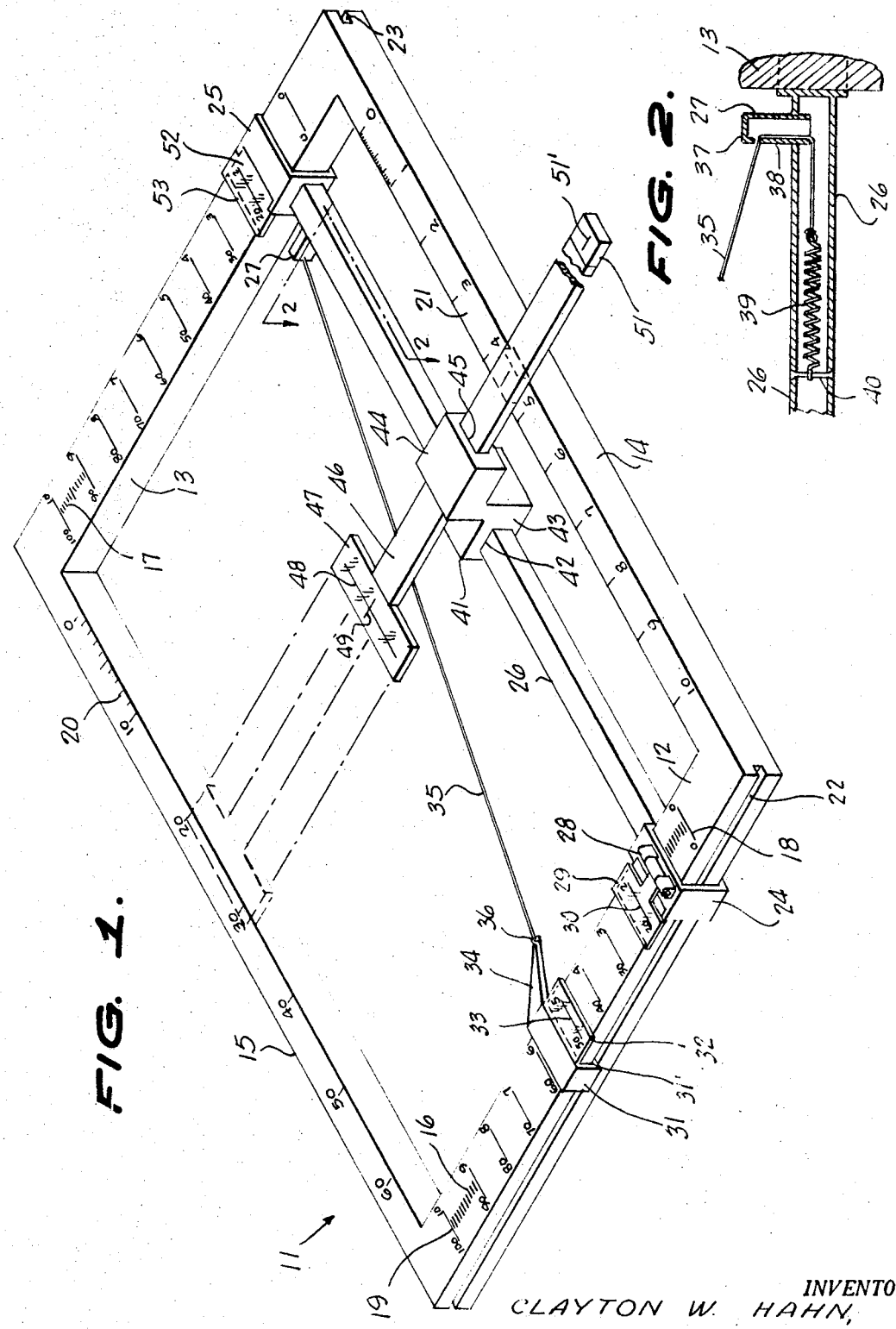
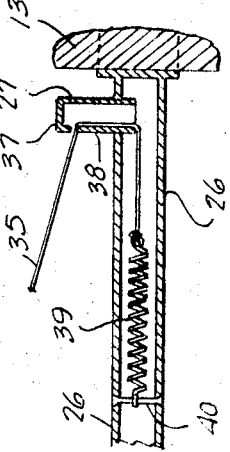
INVENTOR.
CLAYTON W. HAHN,
BY
Berman, Davidson & Berman.
ATTORNEYS.

LINEAR INTERPOLATING DEVICE

This invention relates to mathematical instruments, and more particularly for a device to be used for interpolation in finding the values of mathematical functions, such as trigonometric functions, logarithms, hyperbolic functions, and the like.

A main object of the invention is to provide an improved linear interpolation device for finding the values of mathematic functions, said device being simple in construction, being easy to use, and providing a high degree of accuracy.

A further object of the invention is to provide an improved linear interpolation device especially useful in performing precise interpolation calculations, for example, in finding exact angle values from numerical data, the device being relatively compact in size, being durable in construction, enabling the required calculations to be made in a rapid and accurate manner, and involving relatively few parts.

Further objects and advantages of the invention will become apparent from the following description and claims, and from the accompanying drawing, wherein:

FIG. 1 is a perspective view of an improved linear interpolation device constructed in accordance with the present invention.

FIG. 2 is an enlarged fragmentary vertical horizontal cross-sectional view taken substantially on line 2–2 of FIG. 1.

Referring to the drawing, an improved linear interpolation device constructed in accordance with the present invention is designated generally at 11. The device 11 comprises a rectangular frame of suitable flat rigid bar material and consisting of the respective transverse end arms 12 and 13 and the respective front and rear longitudinal arms 14 and 15. As shown in FIG. 1, the transverse end arms 12 and 13 may be provided with similar scales of digital values, shown at 16 and 17, representing the range of values of specific trigonometric functions, for example, the range of values of sines. Thus, it will be seen that the scales 16 and 17 extend from a zero value, shown at 18, and a unit value shown at 19, in accordance with the range of digital values which correspond to the sines of angles from 0 to 90°. These values, of course, run from 0 to 1.0.

The rear longitudinal arm 15 is provided with a seconds scale 20 extending from zero to 60 seconds, as shown, which is preferably subdivided in any suitable manner, for example, into seconds or fractions of seconds. The front longitudinal arm 14 is similarly provided with an angle decimal scale 21 which is opposite and parallel to the seconds scale 20 and which may be appropriately subdivided, for example, into hundredths as well as tenths.

The outer edges of the transverse end arms 12 and 13 are provided with longitudinal grooves 22 and 23. A pair of rectangular slide sleeves 24 and 25 are slidably engaged on the respective transverse end arms 12 and 13. Rigidly connecting the opposite sleeves 24 and 25 is a hollow tubular rectangular bar 26 which is provided adjacent the transverse end arm 13 with a perpendicularly projecting hollow lug 27 extending parallel to the adjacent transverse end arm 13, as shown in FIG. 2.

Hingedly connected at 28 to the slider 24 is a transparent lens member 29 provided with a reticule line 30 extending parallel to the longitudinal bar 26 and to the longitudinal front and rear arms 14 and 15. The reticule 30 is employed to set the position of the slider 24 relative to the scale 16 in a manner presently to be described. The axis of the hinge assembly 28 extends parallel to the arm 26, enabling the lens plate 29 to be, at times, raised to a noninterfering position, if necessary.

As shown in FIG. 1, the lens plate 29 normally is supported in a horizontal position overlying and close to the top surface of transverse end arm 12 and immediately over the calibration scale 16 inscribed thereon.

Designated at 31 is a further slider which is in the form of a rectangular sleeve having an outer inturned bottom lug 31' slidably received in the groove 22. At its inner end the slider sleeve may be likewise provided with a similar inturned lug slidably received in a guide groove provided on the inside edge of arm 12, not shown in FIG. 1. The auxiliary slider 31 is provided with the horizontal transparent lens plate 32 extending toward the main slider 24 and provided with the reticule line 33 extending parallel to the bar 26 and thus enabling the auxiliary slider 31 to be set at a position corresponding to a valve on the scale 16.

The auxiliary slider 31 is provided with a lug 34, the lug being substantially triangular with its apex end substantially in longitudinal alinement with the reticule line 33. A flexible wire or cable 35 is connected at 36 to the apex of the triangular lug 34 and extends across the frame through an aperture 37 in the facing vertical wall 38 of the hollow lug 27, the flexible wire or cable 35 extending through the lug, as shown in FIG. 2, and being connected to one end of a coiled spring 39, the opposite end of the coiled spring being anchored to a transverse pin 40 secured in the tubular arm 26. The spring 39 thus exerts biasing tension on the flexible cable or wire 35, maintaining the cable or wire 35 taut in spite of the variations in the possible distances between the sliders 24 and 31 as they may be adjusted on the transverse end arm 12 in the manner subsequently to be described.

Designated at 41 is a further slide block which is slidably-mounted on the arm 26, so that it is supported on the arm slidably, but nonrotatably. The block 41 has a lower body section 43 which includes the guide bore 42 and a forwardly-offset top portion 44 formed with a transversely-extending rectangular bore 45 which is parallel to the transverse end arms 12 and 13. Slidably mounted in the bore 45 is a further bar 46 of rectangular cross section which is thus adjustable in a direction parallel to the transverse end arms 12 and 13 and which is thus supported parallel to said transverse end arms. The further arm 46 is provided at its rear end, as viewed in FIG. 1, with a longitudinally extending transparent lens plate 47 provided with the perpendicularly intersecting longitudinal and transverse reticule lines 48 and 49, defining a crosshair assembly. At its opposite end the further bar 46 is provided with a transparent lens plate 51 on which is provided a transversely extending reticule line 51', which, as shown in FIG. 1, may be positioned over the decimal scale 21. The further bar 46 is of sufficient length so that the lens plate 47 may be extended, as required to overlie the minute scale 20, in a manner presently to be described, in determining interpolated angle values.

The slider 25 mounted on the transverse end arm 13 is likewise provided with a transparent lens plate 52 which projects rearwardly and which horizontally overlies the scale 17, the lens plate 52 being provided with a longitudinally extending reticule line 53.

The upper block 44 of the slider 41 is elevated sufficiently so that the lens plate 47 may be adjusted to a position closely overlying the top surface of the transverse end arm 13, namely, to overlie the scale 17, as will be presently described.

It will be noted that the connection 36 between flexible cable 35 and lug 34 is in longitudinal alinement with the reticule line 33 and also is in transverse alinement with the top ends of the longitudinal scales 20 and 21, namely, is in longitudinal alinement with the "60"numeral of the second scale 20 and the "10"numeral of the decimal scale 21. Similarly, the aperture 37, at which the cable enters the hollow lug 27, is in longitudinal alinement with the reticule line 53 and is in transverse alinement with the zero ends of the scales 20 and 21. Thus, the inclined cable 35 can be employed to take linear proportional readings along the subdivision scales 20 and 21, as will be presently described.

The following is an example indicating the method of use of the linear interpolation device 11:

Assume that it is desired to find the angle value in degrees and minutes of the angle whose sine is 0.55860.

From the mathematical tables giving the value of sines, it is found that the sine of 33°, 57 minutes equals 0.55847 and that the sine of 33°, 58 minutes equals 0.55871. The slider member 31 is set so that the reticule 33 overlies the value "71"on the scale 16 of arm 12. The slider member 24 is adjusted so that the reticle 30 overlies the value "47" on scale 16. This, of course, adjusts the bar 26 and the slide member 25 in a corresponding manner, namely, so that the reticule 53 of the slide member 25 is also set to overlie the value "47" on the scale 17.

The slide member 41 is then moved adjacent to arm 13 and the lens 47 is adjusted by moving bar 46 endwise to a position such that the horizontal crosshair 48 overlies the value "60" on scale 17. The slide member 41 is then moved along bar 26 until the intersection of the horizontal crosshair 48 and the vertical crosshair 49 on the lens member 47 is exactly in vertical registry with the cable 35. With the bar member 46 in this position, the bar member 46 is then moved endwise, namely, toward the arm 15 until the lens member 47 overlies scale 20. The crosshair 49 will then indicate the value on scale 20 corresponding to the interpolated required second value lying between 33°, 57 minutes, and 33°, 58 minutes corresponding to the angle whose sine has a value of 0.55860. Thus, in the sample case above-described, the scale 20 gives the interpolated value in seconds of the angle lying between 33°, 57 minutes, and 33°, 58 minutes.

The decimal value corresponding to the above-described second value can be found by moving the bar 46 to a position such that the lens member 51 overlies the decimal scale 21. Under these conditions, the reticule 51' is employed to locate the decimal minute value on scale 21 to be added to the lower limit of the interval between 33°, 57 minutes and 33°, 58 minutes, in the above example, namely, the decimal value to be added to "47" minutes.

It will be readily seen that the apparatus above-described is adaptable for use in interpolation for a wide range of functions. It will also be apparent that the device can be employed to find interpolation angle unit values, such as second values by means of the scale 20 on arm 15, or may be used to find interpolated decimal values by means of the scale 21 on the arm 14.

Where the intervals between the positions of the slide members 31 and 24 are relatively small, some situations may arise where interference may occur between the lens member 32 and 29. Under these conditions, the slide member 24 is first set to its required position wherein the reticule 30 overlies the value on scale 16 corresponding to said position, after which the lens member 29 is pivoted upwardly to a noninterfering position, and the slide member 31 is set to its required position wherein the reticule 33 on lens member 32 overlies the value on scale 16 corresponding to said required position. This can be accomplished even if the lens member 32 moves into the area formerly occupied by the lens member 29.

While a specific embodiment of an improved linear interpolation device has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A linear interpolation calculating device comprising a frame including spaced transverse arms and spaced longitudinal front and rear arms, respective identical first function value scales on the spaced transverse arms, a second scale on at least one of the longitudinal arms calibrated in divisions of one whole unit of a function associated with said function value scales, a longitudinal auxiliary bar, means slidably-supporting said auxiliary bar on said spaced transverse arms, an additional slide member on one of said transverse arms, a flexible cable member connecting said additional slide member to the opposite end portion of said longitudinal auxiliary bar, means exerting tension on said cable member to maintain it substantially taut, a further slide member slidably mounted on said longitudinal auxiliary bar, a transverse bar slidably supported on said further slide member for endwise movement parallel to said spaced transverse arms, and reticule means on said transverse bar adapted to overlie and register with said flexible cable member.

2. The linear interpolation device of claim 1, and respective reticule means mounted on the ends of said longitudinal auxiliary bar and on said additional slide member and overlying the scales on the spaced transverse arms.

3. The linear interpolation device of claim 2, and wherein each of the front and rear longitudinal arms of the frame is provided with a scale representing discrete intervals of one whole unit of a function associated with said function value scales.

4. The linear interpolation device of claim 3, and wherein the scale on one longitudinal arm represents the divisions in seconds of one minute of angle.

5. The linear interpolation device of claim 4, and wherein the scales on the spaced transverse arms represent the digital values corresponding to the natural trigonometric function of an angle.

6. The linear interpolation device of claim 3, and wherein said means exerting tension on the cable member comprises a spring connected between the cable member and said auxiliary bar.

7. The linear interpolation device of claim 6, and wherein said auxiliary bar is hollow and said spring is housed within the auxiliary bar.

8. The linear interpolation device of claim 7, and wherein said auxiliary bar is formed with a hollow lug having an opening in longitudinal alinement with the reticule means on the adjacent end of the auxiliary bar, and wherein said cable member extends through said opening.

9. The linear interpolation device of claim 8, and wherein said additional slide member has an inwardly projecting lug with a portion in longitudinal alinement with the reticule means on said additional slide member, one end of the cable member being attached to said lug portion.

10. The linear interpolation device of claim 9, and wherein at least one of the reticule means associated with said one of the transverse arms of the frame is pivoted so that it can be at times elevated so a nonobstructing position with respect to the other reticule means associated with said one of the transverse arms.